though the melting point of the thermoplastic powder is equal to or greater than that of the sheath, the process and apparatus operate successfully to produce the composite.

United States Patent [19]
Ganga

[11] Patent Number: 4,614,678
[45] Date of Patent: Sep. 30, 1986

[54] FLEXIBLE COMPOSITE MATERIAL AND PROCESS FOR PRODUCING SAME

[75] Inventor: Roland A. Ganga, Joinville le Pont, France

[73] Assignee: Atochem, France

[21] Appl. No.: 624,044

[22] Filed: Jun. 25, 1984

[30] Foreign Application Priority Data

Jun. 28, 1983 [FR] France .................. 83 10632
Apr. 10, 1984 [FR] France .................. 84 05627

[51] Int. Cl.$^4$ .............................................. B32B 1/04
[52] U.S. Cl. .............................. 428/74; 156/244.12;
  264/136; 264/174; 428/283; 428/294; 428/367;
  428/373; 428/392; 428/402; 428/408; 428/902
[58] Field of Search ............... 428/294, 295, 283, 367,
  428/378, 392, 402, 902, 408, 288, 290, 426, 373,
  74; 156/244.12, 180; 264/136, 137, 174

[56] References Cited
U.S. PATENT DOCUMENTS 4,419,400  12/1983  Hindersum ................. 418/288
4,534,919   8/1985  McAhley et al. ........... 264/136

FOREIGN PATENT DOCUMENTS 8310632  6/1983  France .

Primary Examiner—James J. Bell
Attorney, Agent, or Firm—Brooks Haidt Haffner & Delahunty

[57] ABSTRACT

Composite material comprising a flexible sheath covering a roving of fibers impregnated to the core with a finely powdered thermoplastic, the melting point of which thermoplastic is equal to or greater than that of the sheathing material, together with process and apparatus for producing same by using an extrusion coating technique, the coating die being mounted on a leakproof powder fluidization tank via a blowing chamber thermally insulated from the tank.

7 Claims, 4 Drawing Figures

FLEXIBLE COMPOSITE MATERIAL AND PROCESS FOR PRODUCING SAME

BACKGROUND OF THE INVENTION

This invention relates to a novel composite flexible material, and more particularly, it relates to a composite material comprising a flexible sheath covering a roving of continuous fibers of any type, be they mineral, organic or metallic, impregnated to the core with thermoplastic powders, the melting point of which powders being greater than or equal to that of the flexible sheath, and to processes and apparatus for preparing such composites.

A composite material has already been described in French parent patent application No. 83 10632. In this application, the melting point of the material used for the powder with which the fibers were impregnated was, however, restricted to a level considerably higher than that of the sheathing material's melting point.

The new composite material in accordance with the present invention is importantly superior in its flexibility. The prior art composites, as shown in French patent application No. 81 21545, for example, although pliable, are rigid materials. They are in the form of strips, five to ten mm in width and about one mm thick, and contain continuous parallel fibers like a reinforcement solidly embedded in a thermoplastic matrix which has been subjected to fusion and subsequent solidification by cooling.

Clearly, this type of material can only be rigid; experience also shows that it breaks when bent.

An object of the present invention is to overcome this drawback which proves a great handicap, in those applications in which the composite is to be placed around metal objects with a small bending radius (a radius of 8–10 mm, for example), such as those encountered in production of automotive components (steering wheel frames, hydraulic cylinders, etc.).

THE INVENTION

In the process to which the invention refers, a roving of continuous, parallel—i.e., not twisted fibers is impregnated with particles of thermoplastic powder, taking advantage of the momentary spreading out of these fibers when dipped in a fluidized bed of powder particles. These particles of powder accumulate around each individual fiber in the roving due to electrostatic charges created using known techniques (electrostatic generator, friction brushes or rollers, and the like).

By gathering together these individual fibers loaded with a fine powder of thermoplastic material, a roving of parallel fibers impregnated to the core with fine powder, and also covered on its periphery with a layer of the same fine powder, is obtained.

This roving loaded with thermoplastic fine powder is then extrusion coated or dip coated with a solution or dispersion to provide a continuous thermoplastic outer sheath, allowing free intermingling of the powder particles and the fibers within it.

The process of the present invention provides composite materials which remain flexible and can be bent, and even knotted, without breaking. These flexible composite materials are thus suitable for braiding, weaving, and even knitting operations, opening up vast possibilities for use of this material, possibilities beyond the reach of prior art materials because of the brittleness upon bending of the latter, as noted above.

This invention is further described by reference to the accompanying drawings, wherein.

Figure 1:
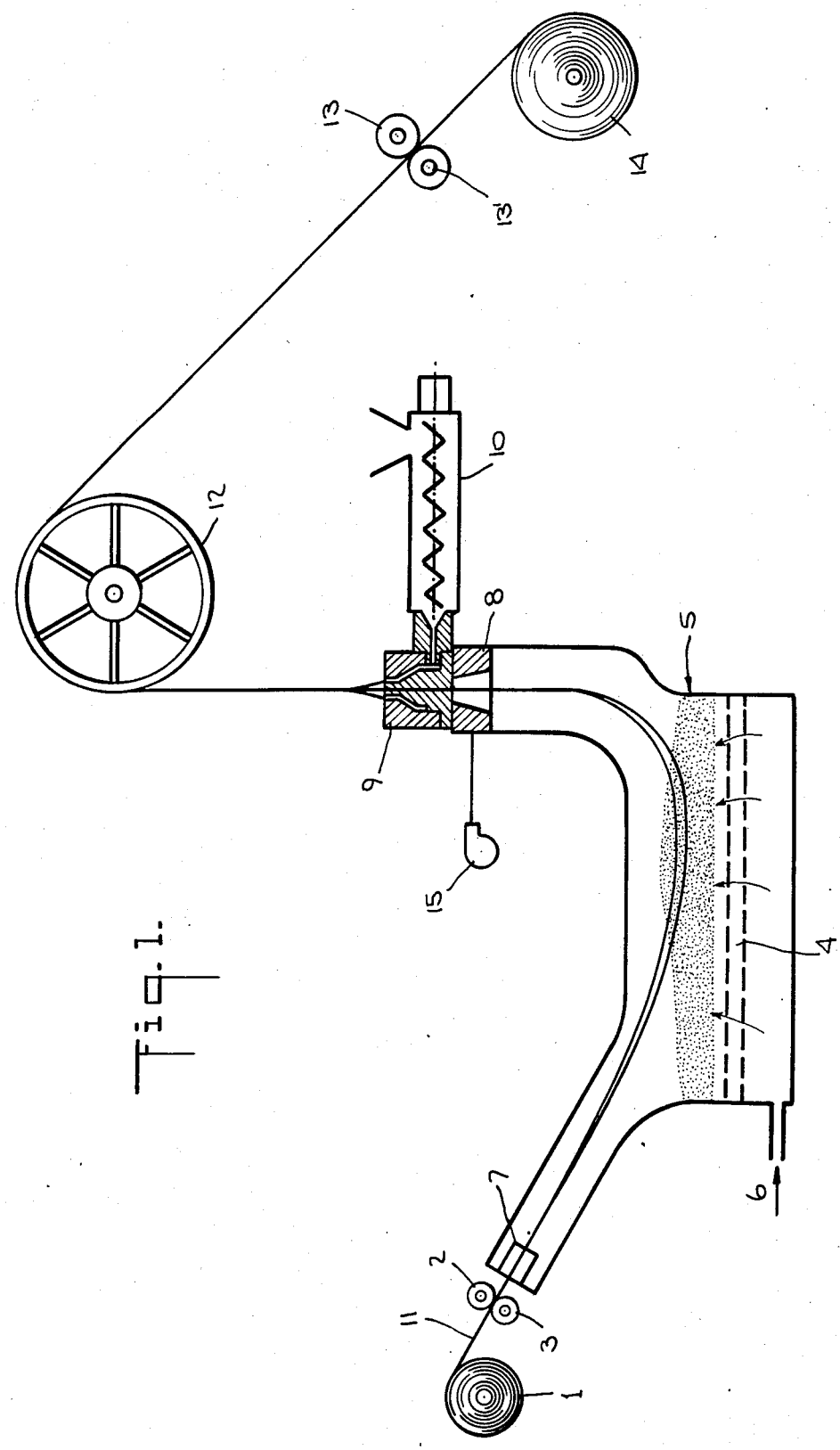
FIG. 1 shows an elevation view, partly in section, of apparatus used according to the invention.

Flexible composite materials can be obtained according to this invention with a fiber content of up to 50% by volume and 70% by weight.

The reinforcing fiber can be glass fiber, preferably of a size between 160 and 320 tex, for covering with ordinary polymers as disclosed herein. Fibers of a size between 1200 and 2400 tex having been rised for coating with extremely high fluidity polymers, also disclosed herein.

Other fibers used belong to the aramide family, such as superpolyamides with an aromatic base, like Kevlar fibers. A preferred size is, for example, 1580 decitex. Coating is carried out with the same types of polymers as for glass fibers.

Further, carbon fibers, the size of which is expressed in filaments (or in actual fact in kilofilaments), can also be used in this invention. Sizes in the 3 to 12 kilofilament range are best suited to production of flexible composite materials in accordance with this invention.

It will be apparent from the present disclosure that a wide variety of thermoplastic powders, such as powdered polypropylene, polyethylene, PVC (polyvinyl chloride), polyester homo- and copolymers, polyvinylidene fluoride, and the like can be used in the present invention.

Among the resins in fine powder form introduced into the core of the roving of continuous fibers, those desired in certain embodiments of the invention are polyamide powders, that is to say, polymers obtained by polycondensation of 1 lactams (caprolactam, lauryl lactam, and the like) or from aminoacids such as the product of adipic acid and hexamethylene diamine, amino undecanoic acid, polyamidic copolymers, or the like.

The process of coating the continuous rovings loaded with fine powder, which is a characteristic of the invention, can be carried out without bringing the particles of fine powder, with which the roving is impregnated, to their melting point. To accomplish this, either resins with a melting point lower than that of the powder, such as 6/6.6/12 terpolymer which melts at 105° C., or resins of the same type as the powder but with a lower melt viscosity are used to meet the requirements of the extrusion coating technique. Such resins also include polyamides 6, 11 and 12, polypropylene, polyethylenes, PVDF, and polyesters, polysulfone, polyphenylene sulfide, plyimide, polyetherimide, polyetheretherketone.

In one version of the process according to the invention, the spread-out roving is impregnated with fine powder by passage through a bath of aqueous or organic fine powder dispersion, as described in French patent application No. 81 03528, followed by drying. In another version, the roving containing the powder particles can be coated using one or the other of the following techniques, within the scope of the invention: Either passage through a melting unit containing the molten sheathing material, or passage through a first bath of liquid monomer or oligomer and then through a second bath also containing liquid monomer or oligomer which reacts with that of the first bath to provide a thermoplastic material. The pairs of monomers and/or oligomers used in certain preferred embodiments include polyols-polyisocyanates, giving polyurethanes; polyurethanespolyureas; epoxy resins with hardener; epoxy resinsdicarboxylic polymers, or the like.

A further aspect of this invention resides in apparatus and processes which permit commercial realization of the objects of the invention, that is, to obtain flexible composite materials containing rovings of continuous fibers impregnated to the core with thermoplastic fine powder without melting the particles of fine powder.

A process for production of a flexible composite material according to the present invention is illustrated in FIG. 1.

Continuous roving of fibers 11 is unwound from feed reel 1 under traction created by guide rolls 2 and 3. Via air-lock 7, the roving enters fully sealed fluidization chamber 4, where finely powdered thermoplastic 5 is maintained in a state of fluidization by compressed air fed through conduit 6 into the lower chamber. The roving is spread out or opened by known means such as rollers or splined cylinders, not shown in FIG. 1, but shown in French patent application No. 83 10632. The roving 11 becomes electrostatically charged by friction against these members and then progresses, now covered with fine powder, to the fluidization tank outlet, second air-lock 8.

Figure 2:
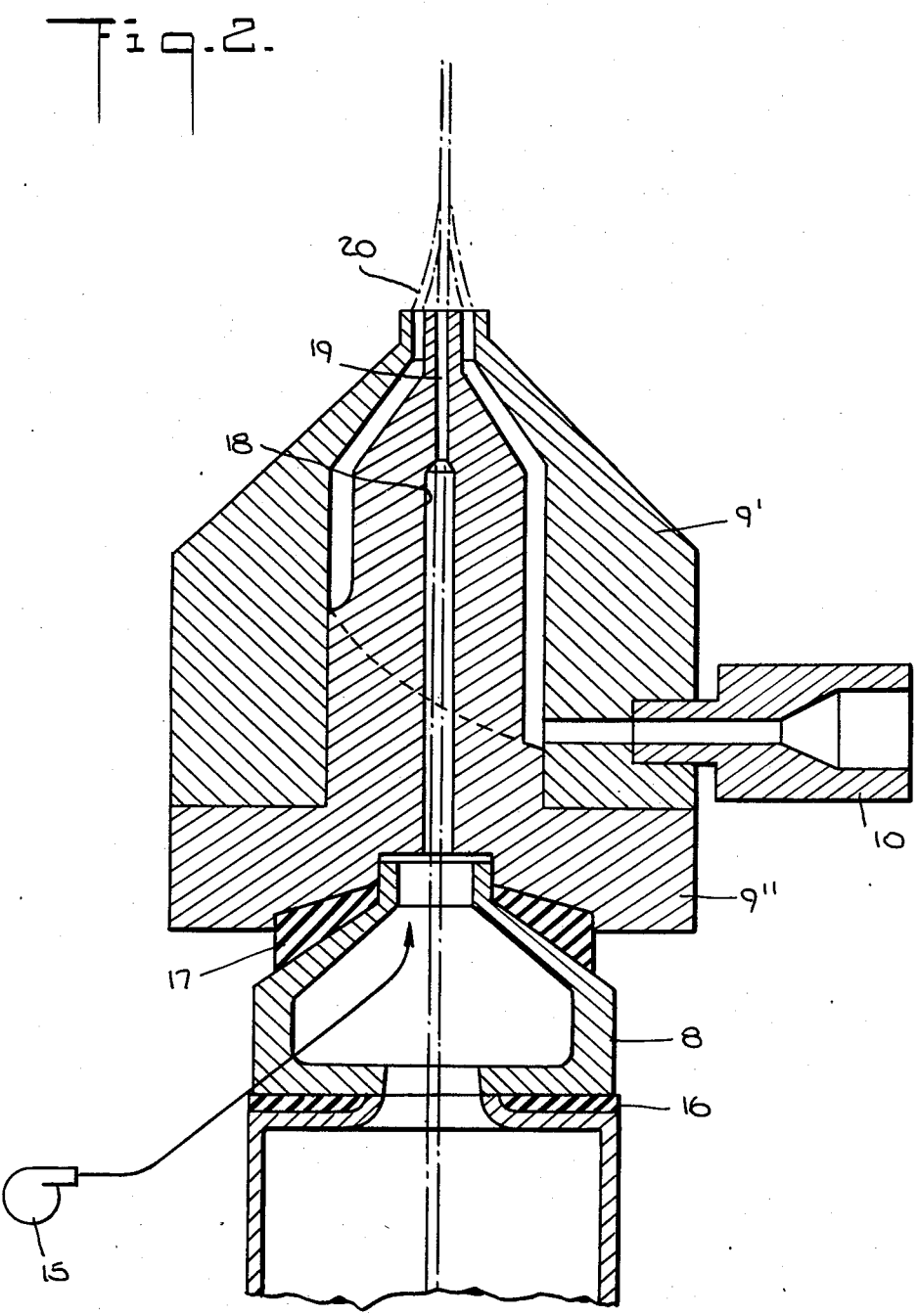
FIG. 2 is a sectional view of a coating die used in practicing the invention.

Lock 8 is mounted to both fluidization chamber 4 and coating cross head 9 by means of two thermal seals 16 and 17, shown in FIG. 2. These seals allow maximum reduction of heat exchange between lock 8 and both the coating cross head 9, a source of heat due to its positive heating (not shown), and the end of fluidization tank 4. This heat insulation avoids gelling of the powder in contact with hot surfaces on which it might melt. In a preferred version of the apparatus, insulating seal 16 is machined from a "Teflon" PTFE sheet and insulating seal 17 is sintered zirconium oxide.

The tightness of the connections between fluidization tank 4, lock 8 and cross head 9 is intended to prevent particles of powder from escaping outside the installation and causing difficulties owing to their ignition.

To supplement the back-flow by which any particle of powder not adhered to the roving by the electrostatic charge is returned to the tank, a light air current is generated in air-lock 8 by low volume pump 15. This pump is of the roller type as supplied to laboratories by the W. Bachofen organization of Basel. The air pressure provided by this pump is in the 0.10 to 0.30 bar range, and the flow can be reduced to a minimum, so as to generate a so-called "bubbling" air stream, by reducing the speed of rotation of the roller rotor with which it is equipped and which creates the air displacement in a flexible hose cyclically closed by the roller rotor.

Small cyclone separators, not shown, allow the excess air introduced by means of the pump 15 to escape with recovery of the small quantities of powder carried along by the air.

At the outlet of lock 8 the roving filled with the fine powder enters die 9. It is desirable in certain preferred embodiments to provide wire guider 19 with an enlarged inlet 18 in order to avoid gelling of the powder due to melting upon prolonged contact with metal markers of the cross head 9' and 9".

It is preferred to provide an inlet with a section between 1.5 and 3 times that usually used for a wire guider when such a guide would be used to coat electric and telephone cables having a cross section equivalent to that of the roving.

Cross head 9' and 9" is fed with plastic sheathing material by extruder 10 represented in the drawing by its barrel/die connection. The plastic sheathing material leaves the die in the form of so-called "sleeving", that is, the outlet diameter of the plastic sheath is determined by a mandrel with a diameter greater than the external diameter of the roving. The sheath of molten material then shrinks due to traction on the section leaving the die and comes into contact with the roving at a distance of about 5 mm from the outlet.

This coating head is advantageously positioned with a vertical axis. The section is almost cold after having travelled about 1 m through the air. It remains flexible and runs over slotted pulley 12 which is about 600 mm in diameter. The impregnated roving is then guided by rollers 13 and 13' and is wound onto take-up reel 14.

Figure 4:
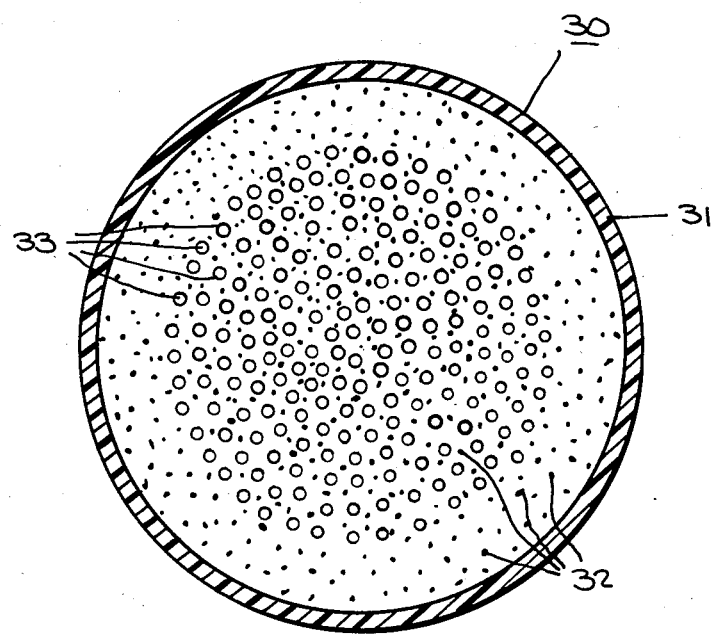
FIG. 4 illustrates, in cross section, a flexible composite manufactured according to the invention.

The composite 30 so formed comprises flexible sheath 31 covering roving 33 of fibers impregnated with thermoplastic powder 32, as shown in FIG. 4.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

A 320 tex roving loaded with Atochem Orgasol 1002 fine powder is extrusion coated with a sheath of Atochem Rilsan AMNO resin.

The product characteristics are as follows:
Fine powder:
  Polyamide 6
  Bulk density: 0.50
  Melt index: between 20 and 60 (1)
Sheath:
  Polyamide 12
  Density: 1.5
  Melt index: between 10 and 40 (2)

(1) measured at 235° C. with a 1 kg weight
(2) measured at 190° C. with a 2 kg weight.

The glass fiber used in this Example has a density of 2.40. A Maillefer 30 extruder is used with a coating die of the type used for "sleeving" technique. The diameter of the die is 3.5 mm; the diameter of the mandrel is 2.9 mm; the diameter of the wire guider, 1.5 mm; the inlet diameter, 2.4 mm. The die temperature is maintained at 195° C. with a winding speed of 100 m/min.

The flexible composite so produced has the following characteristics:

|  | Glass fibers | Fine powder | Sheath |
|---|---|---|---|
| Percentage by weight | 75 | 11 | 14 |
| Percentage by volume | 47 | 33 | 20 |

EXAMPLE II

A composite material in accordance with the invention, as shown in FIG. 4, is used to reinforce plastic injection-molded components intended for use under high internal pressure, e.g., hydraulic cylinders.

Such parts consist, for example, of a closed bottom cylinder with a length of 100 mm, a bore of 16 mm, and a wall thickness of 4 mm.

To allow comparative testing, these are produced using each one of the following four techniques:

1. Part injection molded in polyamide 11 blended with short glass fibers (Atochem Rilsan ZMO).
2. Part produced using the same mold and plastic as in 1 but after positioning on the core of the mold prior to injection, single layer 23 in FIG. 3 of flexible composite material, as in Example I, the composite being wound loosely around the core in contiguous spirals.
3. Part produced as in 2 but with a tension of 2 daN applied on the composite during winding.
4. Part produced as in 3 but with two superimposed thicknesses of composite, the winding tension being maintained at 2 daN.

Figure 3:
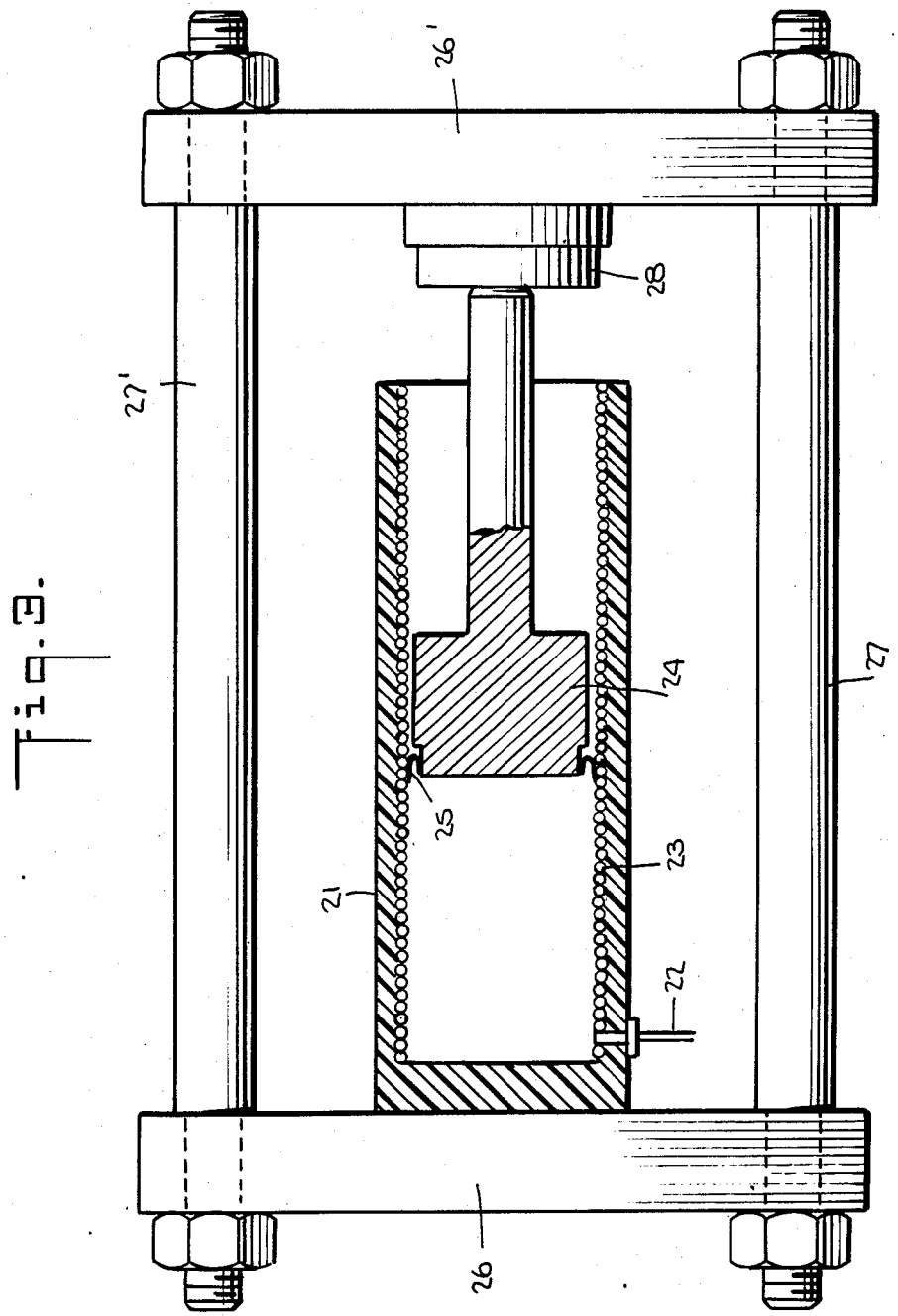
FIG. 3 is a view of an article manufactured according to the invention, emplaced on a burst strength test apparatus.

Referring to FIG. 3, to measure the burst pressures for the parts obtained using the four techniques described above, a hole is drilled through cylinder 21 and it is connected via fitting 22 to a source of fluid under pressure. Piston 24 fitted with lipped seal 25 moves freely within the cylinder bore. For the purposes of the burst tests, piston 24 is made from steel.

The apparatus consisting of the plastic cylinder and the steel piston is placed in a rigid framework formed by two plates 26 and 26' and two uprights 27 and 27'. Dynamometer 28 is placed between the piston rod and plate 26'.

The burst pressure values can be computed from the measured forces, using the equation:

F=pS, where p is the pressure and S is the cross-sectional area. Because of the bore measurement chosen, the section S is $2.10^{-4}$ m$^2$, and thus F=2p.

Under these conditions, the average burst pressure values recorded are as follows:

| Test type | Bursting force (daN) | Burst pressure (GPa) |
| --- | --- | --- |
| 1 | 400 | 2 |
| 2 | 450 | 2.25 |
| 3 | 1,000 | 5 |
| 4 | 1,100 | 5.50 |

These data clearly demonstrate the improvement in mechanical strength due to the flexible composite material, especially when it is wound under tension. Moreover, given the small winding diameter, it is evident that only a flexible composite according to the invention is suitable for this operation.

What is claimed is:

1. A composite article comprising a flexible sheath covering a roving of fibers impregnated with thermoplastic powder, the melting point of the powder being the same or greater than that of the flexible sheathing material.
2. A composite according to claim 1 wherein the flexible sheath material selected is a thermoplastic resin.
3. A composite according to claim 1 wherein the fiber is glass fiber, polymer fiber, or carbon fiber.
4. A composite according to claim 1 wherein the powder is polyamide, polypropylene, polyethylene, polyvinyl chloride, thermoplastic polyesters polyvinylidene fluoride, polyphenylene sulfide, polyetheretherketone, polyimide, polyetherimide, polysulfone.
5. A process for preparing a composite article according to claim 1, which process comprises introducing the thermoplastic powder into and onto the peripheral surface of a continuous fiber roving so as to coat the individual fibers of the roving and thereafter covering the roving with a sheath of flexible material, the melting point of which material is the same or less than that of the thermoplastic powder.
6. A process according to claim 5 wherein the covering with the sheath is carried out at a temperature below the melting point of the thermoplastic powder.
7. A process according to claim 5 wherein the flexible sheath is applied to the roving by extrusion.

* * * * *